(12) United States Patent
Taylor et al.

(10) Patent No.: US 8,401,290 B2
(45) Date of Patent: Mar. 19, 2013

(54) METHOD AND SYSTEM FOR PROCESSING TO ENHANCE DIGITAL IMAGES

(75) Inventors: Billy P. Taylor, Cedar Park, TX (US);
Craig A. Miller, Cedar Park, TX (US)

(73) Assignee: Libredigital, Inc., Austin, TX (US)

( * ) Notice: Subject to any disclaimer, the term of this patent is extended or adjusted under 35 U.S.C. 154(b) by 874 days.

(21) Appl. No.: 12/179,380

(22) Filed: Jul. 24, 2008

(65) Prior Publication Data

US 2010/0021053 A1 Jan. 28, 2010

(51) Int. Cl.
*G06K 9/38* (2006.01)

(52) U.S. Cl. ........................ 382/172; 382/274

(58) Field of Classification Search ............... 250/208.1; 345/102, 589, 591, 593; 348/234, 311, 362; 358/1.9, 2.1, 446–448, 474, 518; 382/108, 382/128, 130, 132, 133, 141, 149, 167–170, 382/176, 254, 274, 164, 165, 182, 218, 299
See application file for complete search history.

(56) References Cited

U.S. PATENT DOCUMENTS

| | | | | |
|---|---|---|---|---|
| 5,883,973 A * | 3/1999 | Pascovici et al. | ............. | 382/176 |
| 5,999,646 A * | 12/1999 | Tamagaki | ..................... | 382/169 |
| 6,043,900 A * | 3/2000 | Feng et al. | ..................... | 358/1.9 |
| 6,118,895 A * | 9/2000 | Hirota et al. | .................. | 382/165 |
| 6,198,841 B1 * | 3/2001 | Toyama et al. | ............... | 382/164 |
| 6,198,845 B1 * | 3/2001 | Tse et al. | ..................... | 382/169 |
| 6,236,751 B1 * | 5/2001 | Farrell | ......................... | 382/168 |
| 6,631,209 B1 * | 10/2003 | Kanamori | ..................... | 382/169 |
| 6,920,245 B1 * | 7/2005 | Hirayama | ..................... | 382/167 |
| 6,961,066 B2 * | 11/2005 | James | ........................... | 345/589 |
| 7,099,042 B2 * | 8/2006 | Yaguchi | ........................ | 358/1.9 |
| 7,283,683 B1 * | 10/2007 | Nakamura et al. | ............ | 382/274 |
| 7,292,365 B2 * | 11/2007 | Knox | ........................... | 358/1.16 |
| 7,330,600 B2 * | 2/2008 | Nishida | ........................ | 382/274 |
| 7,586,653 B2 * | 9/2009 | Pulsifer | ........................ | 358/461 |
| 7,715,047 B2 * | 5/2010 | Momose et al. | ............... | 358/1.9 |
| 7,889,329 B2 * | 2/2011 | Petrich et al. | .................. | 356/39 |
| 7,916,942 B1 * | 3/2011 | Ohara | ........................... | 382/168 |
| 8,111,949 B2 * | 2/2012 | Sakurai | ........................ | 382/299 |
| 2001/0055122 A1 * | 12/2001 | Nagarajan et al. | ............ | 358/1.9 |
| 2008/0131001 A1 * | 6/2008 | Hofman et al. | ............... | 382/182 |
| 2010/0215277 A1 * | 8/2010 | Huntington et al. | .......... | 382/218 |

* cited by examiner

*Primary Examiner* — Vu Le
*Assistant Examiner* — Xuemei Chen
(74) *Attorney, Agent, or Firm* — Sprinkle IP Law Group

(57) ABSTRACT

A system reads a digital image that includes a set of pixels. The system determines a distribution of colors of the pixels of the digital image. Also, the system analyzes the distribution to identify a range of colors of a background of the digital image. Further, the system identifies pixels whose colors are within the identified range, and the system modifies the identified pixels to have a different color.

18 Claims, 8 Drawing Sheets

FIG. 2

Suddenly he reappeared. He had spun his horse around and now was riding back toward me. He seized up on the reins.

"That book, *muchacho*. You can read it?" he asked.

"Of course," I said.

"Every word?"

"Most of them."

"Pick it up," he said.

I gathered up the book. He reached down to me, and I grabbed his arm like a life preserver. I could feel the great strength in his arm as he hoisted me behind him on the horse.

"*Si*, I will let you ride with us, Yankee," he said.

I was dumbfounded. "You aim to learn how to bake biscuits, sir?"

"Don't ask stupid questions."

"But it's a cookbook!"

He gave a small, indifferent shrug. "Will it tell me how to cook the *gringo's* goose, eh? Hang on, *muchacho*."

• • 15 | HIDE

FIG. 4

Suddenly he reappeared. He had spun his horse around and now was riding back toward me. He seized up on the reins.

"That book, *muchacho*. You can read it?" he asked.

"Of course," I said.

"Every word?"

"Most of them."

"Pick it up," he said.

I gathered up the book. He reached down to me, and I grabbed his arm like a life preserver. I could feel the great strength in his arm as he hoisted me behind him on the horse.

"*Si*, I will let you ride with us, Yankee," he said.

I was dumbfounded. "You aim to learn how to bake biscuits, sir?"

"Don't ask stupid questions."

"But it's a cookbook!"

He gave a small, indifferent shrug. "Will it tell me how to cook the *gringo's* goose, eh? Hang on, *muchacho*."

• • 15 I HIDE

FIG. 5

| FIG. 6A | FIG. 6B |

FIG. 6

| FIG. 7A | FIG. 7B |

METHOD AND SYSTEM FOR PROCESSING TO ENHANCE DIGITAL IMAGES

BACKGROUND

The disclosures herein relate in general to information handling systems, and in particular to a method and system for processing digital images. Digital images are processed to enhance their quality. However, previous techniques for processing digital images have various shortcomings. Thus, a need has arisen for a method and system for processing digital images, in which various shortcomings of previous techniques are overcome.

DETAILED DESCRIPTION

Figure 1:
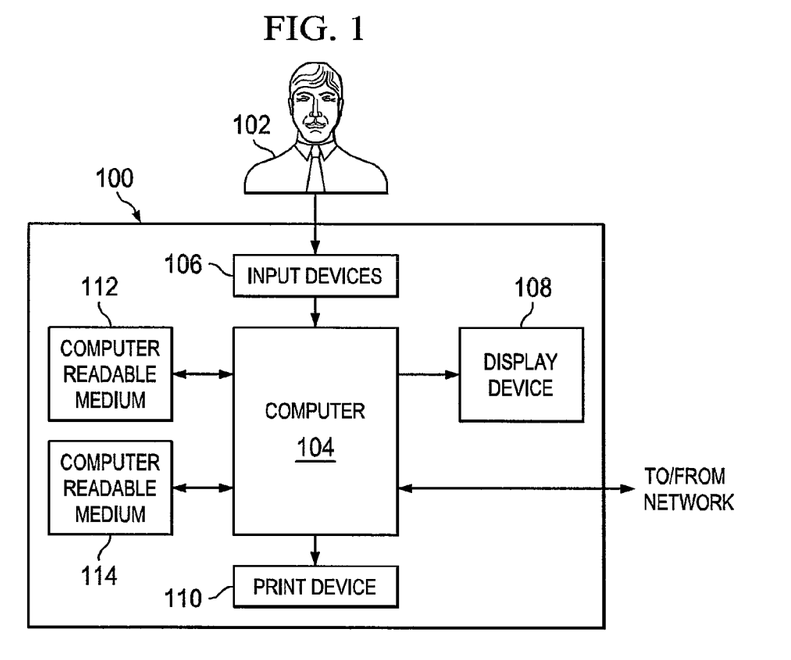
FIG. 1 is a block diagram of an information handling system for processing digital images according to the illustrative embodiment.

FIG. 1 is a block diagram of an information handling system, indicated generally at 100, for processing digital images according to the illustrative embodiment. In the example of FIG. 1, the system 100 operates in association with a human user 102. The system 100 is formed by various electronic circuitry components, including: (a) a general purpose computer 104, such as a workstation or server, for executing and otherwise processing instructions, and for performing additional operations (e.g., communicating information) in response thereto, as discussed further hereinbelow; (b) input devices 106 for receiving information from the user 102; (c) a display device 108 (e.g., a conventional flat panel monitor) for displaying information to the user 102; (d) a print device 110 (e.g., a conventional electronic printer or plotter) for printing visual images on paper; (e) a computer-readable medium (or apparatus) 112 (e.g., a hard disk drive or other nonvolatile storage device) for storing information; (f) a portable computer-readable medium (or apparatus) 114 (e.g., a portable hard disk drive, flash memory card, CD-ROM, or magnetic tape) for storing information; and (g) various other electronic circuitry for performing other operations of the system 100.

Accordingly, in the example of FIG. 1, the computer 104 is connected to the input devices 106, the display device 108, the print device 110, the computer-readable medium 112, and the computer-readable medium 114, as shown in FIG. 1. Also, for example, the computer 104 includes a memory device (e.g., random access memory ("RAM") device and/or read only memory ("ROM") device) for storing information (e.g., instructions of software executed by the computer 104, and data processed by the computer 104 in response to such instructions).

In response to signals from the computer 104, the display device 108 displays visual images, which represent information, and the user 102 views such visual images. Moreover, the user 102 operates the input devices 106 to output information to the computer 104, and the computer 104 receives such information from the input devices 106. Also, in response to signals from the computer 104, the print device 110 prints visual images on paper, and the user 102 views such visual images.

The input devices 106 include, for example, a conventional electronic keyboard (or keypad) and a pointing device, such as a conventional electronic "mouse," rollerball or light pen. The user 102 operates the keyboard (or keypad) to output alphanumeric text information to the computer 104, which receives such alphanumeric text information. The user 102 operates the pointing device to output cursor-control information to the computer 104, and the computer 104 receives such cursor-control information. The input devices 106 also include, for example, touch-sensitive circuitry of a liquid crystal display ("LCD") device.

The computer 104 is coupled through a network to various other devices (not shown in FIG. 1). Through such network, the computer 104 outputs information (e.g., instructions, data, signals) to such devices, which receive and operate in response to such information. In one example, such information is specified by the user 102 to the computer 104 through the input devices 106. Also, through such network, such devices output information to the computer 104, which receives and operates in response to such information. In one example, such information is output by the computer 104 for display to the user 102 through the display device 108 and the print device 110, in response to command(s) from the user 102.

In one embodiment, the input devices 106 include an electromechanical scanner (e.g., high-speed bulk scanner) for scanning images from paper and/or other 2-dimensional objects. The user 102 operates the scanner by placing the object in (or on) the scanner and commanding the scanner to scan an image from the object. In response to the scanning, the scanner outputs a corresponding digital image (e.g., TIF file or JPG file) to the computer 104.

The corresponding digital image is a facsimile reproduction of the scanned image from the object. The computer 104 receives and stores the corresponding digital image (e.g., in the memory device of the computer 104), and optionally outputs the corresponding digital image to the computer-readable medium 112 for storage therein. Also, the computer 102 is operable to receive digital images from the network.

In the illustrative embodiment, the scanner scans the image from the object by: (a) passing a light source along the object's surface; (b) with electronic circuitry, measuring densities of light that is reflected (or refracted) at numerous regularly-spaced intervals along the object's surface; and (c) converting the measured densities into corresponding digital pixels that aggregately form the digital image at a high resolution of horizontal and vertical light samples per image. The measured densities represent variations in color (e.g., shades of gray). In one example, the scanner performs a 600 dot-per-inch ("DPI") scan of an 8½-by-11 inch sheet of paper and, in response thereto, outputs the corresponding digital image having 33,660,000 pixels (5,100 pixels wide by 6,600 pixels long).

With such high resolution, various problems are potentially introduced in the corresponding digital image. For example, due to intensity of the light source, the corresponding digital images often have a gray, cyan, or green tint in their backgrounds. Moreover, some printers (e.g., offset printers) operate by depositing ink on a relatively flat sheet of paper to form an image. In that case: (a) the image is actually formed by 3-dimensional ink bumps on the relatively flat sheet of paper, even though a human may perceive that the image is 2-dimensional; and (b) the corresponding digital image (output by the high-resolution scanner) represents a 3-dimensional ink bump as several digital pixels having variations in color (e.g., shades of gray). In one example, the corresponding digital image represents: (a) a top of the 3-dimensional ink bump as digital pixels having lighter color; and (b) sides of the 3-dimensional ink bunk as digital pixels having darker color. In that manner, the corresponding digital image represents the ink bumps as being lighter than pure black ink on pure white paper.

In another example, if the scanned object has imperfections (e.g., wrinkles, smudges, fingerprints), then such imperfections are potentially scanned (by the high-resolution scanner) into the corresponding digital image. In yet another example, if a very thin sheet of paper has a first image on a front side of the paper and a second image on a back side of the paper (e.g., as might exist in a paperback novel), then: (a) part of the second image (from the back side) is potentially visible (as a reverse image) through the front side, especially when the paper is illuminated by the light source; and (b) in that case, such visible reverse image (from the back side) is potentially scanned (by the high-resolution scanner) as further imperfection into the corresponding digital image when the high-resolution scanner is scanning the front side.

In certain documents that have edge-binding (e.g., books), pages are printed in an off-centered manner, so that additional white space exists along the edges (to accommodate the edge-binding). If such pages are removed from the binding and scanned, their corresponding digital images may appear to be inconsistently off-center (from page to page, relative to one another) when displayed sequentially on the display device 108. For example, a first page's image (e.g., text) may appear closer to the first page's left edge, while a second page's image may appear closer to the second page's right edge. The system 100 automatically processes the corresponding digital images to appear more consistently centered (from page to page, relative to one another) when displayed sequentially on the display device 108, but such consistency is more readily achieved if the system 100 has already removed imperfections (e.g., wrinkles, smudges, fingerprints) in the corresponding digital images.

If the scanner receives and scans the pages at skewed angular orientations (e.g., as incorrectly placed by the user 102, or as skewed by a malfunctioning tractor feed), their corresponding digital images may appear to be inconsistently angled (from page to page, relative to one another) when displayed sequentially on the display device 108. The system 100 automatically processes the corresponding digital images to appear more consistently angled (from page to page, relative to one another) when displayed sequentially on the display device 108, but such consistency is more readily achieved if: (a) the system 100 has already removed imperfections (e.g., wrinkles, smudges, fingerprints) in the corresponding digital images; and (b) a contrast is enhanced between a color (e.g., black ink) of such images and a color (e.g., white paper) of their backgrounds.

As discussed further hereinbelow in connection with FIGS. 2-7, even if numerous pages (and/or other objects) are scanned (e.g., an entire library of books), the system 100 automatically: (a) substantially removes various tint in backgrounds of the corresponding digital images; (b) darkens/lightens the corresponding digital images to enhance a contrast between such images and their backgrounds; (c) substantially removes various imperfections (e.g., wrinkles, smudges, fingerprints, visible reverse images) in the corresponding digital images; and (d) processes the corresponding digital images to appear more consistently centered and more consistently angled (from page to page, relative to one another) when displayed sequentially on the display device 108. Such automatic processing of numerous pages is advantageous in comparison to manual processing.

Figure 2:
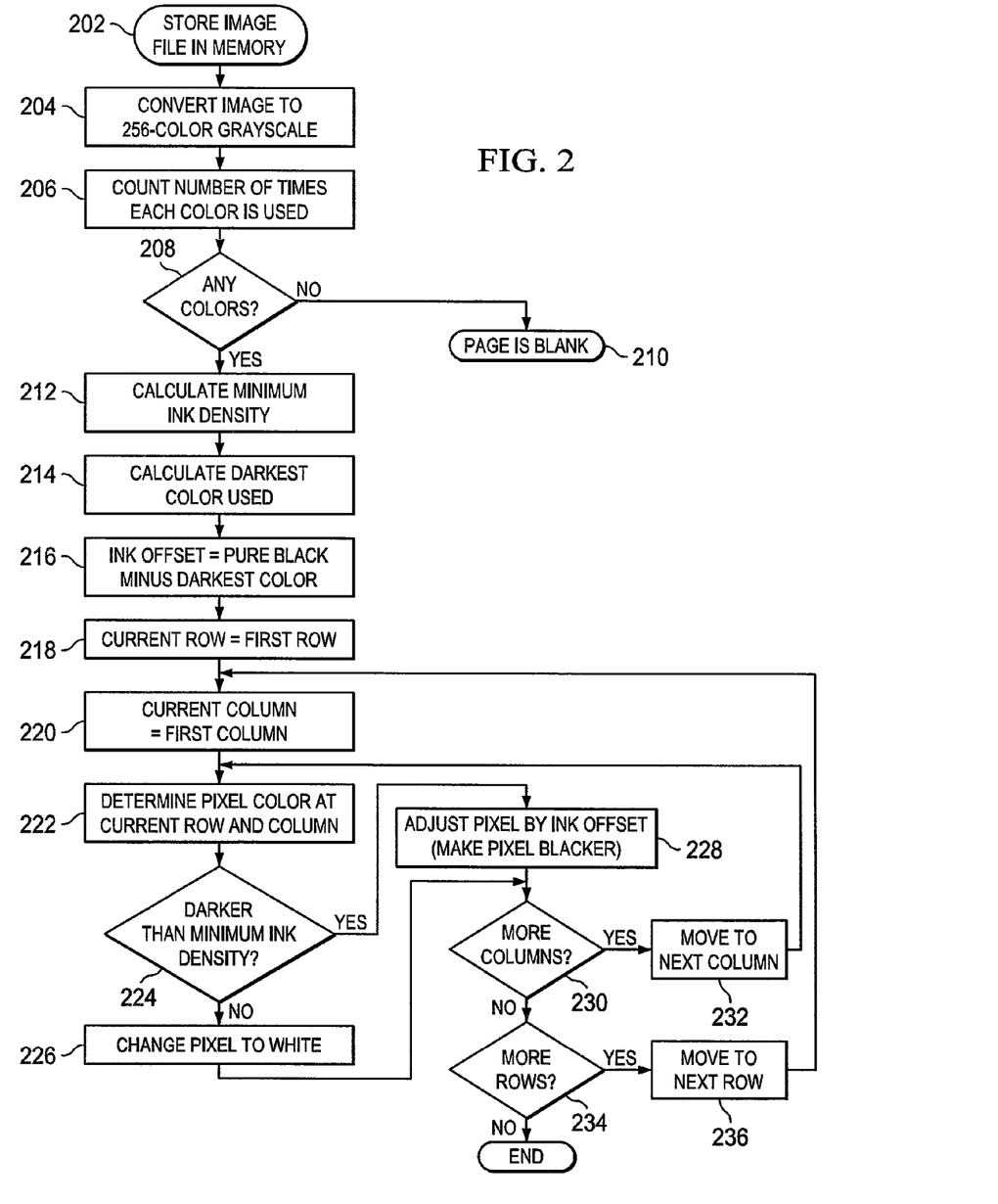
FIG. 2 is a flow diagram of an operation, performed by the system of FIG. 1, for processing digital images according to the illustrative embodiment.

FIG. 2 is a flow diagram of an operation, performed by the system 100, for processing digital images according to the illustrative embodiment. The operation begins at a step 202, where the system 100 stores a digital image in the memory device of the computer 104. The digital image includes a set of pixels.

At a next step 204, the system 100 converts each pixel of the digital image to an 8-bit color value, so that the system 100 stores (in association with such pixel) an 8-bit color value that most closely matches the measured color of such pixel. In the illustrative embodiment, the 8-bit color values range from pure white (value 255) to pure black (value 0), with 254 shades of gray in between. At a next step 206, the system 100: (a) for each 8-bit color value, counts (or otherwise determines) a number of pixels (of the digital image) that have such color value; and (b) in response to such counts, determines a distribution of color values of the pixels (of the digital image). In an alternative embodiment of the step 206, the system 100: (a) for each 8-bit color value, counts (or otherwise determines) a number of pixels (of multiple digital images that were scanned from the same document) that have such color value; and (b) in response to such counts, determines the distribution of color values of the pixels (of the multiple digital images that were scanned from the same document).

Figure 3:
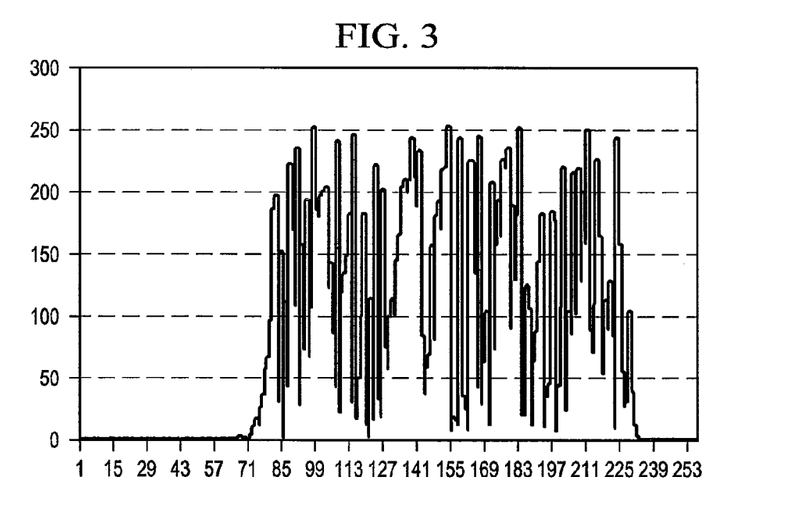
FIG. 3 is a graph of color distribution for an example digital image, as determined by the system of FIG. 1.

FIG. 3 is a graph of color distribution for an example digital image of FIG. 4 (which is discussed further hereinbelow), as determined by the system of FIG. 1 at the step 206. Accordingly, the graph of FIG. 3 shows a number of pixels (of the example digital image) that have a particular one of the 256 color values (values 0 through 255), so that each color value (X axis) has its respective pixel count (Y axis), which is the number of pixels that have such color value. As shown in the example of FIG. 3, no pixel has a pure black (value 0) color, and no pixel has a pure white (value 255) color, but numerous pixels (of the example digital image) have various shades of gray in between (concentrated, in frequency of occurrence, within several discrete groups of color values). In the illustrative embodiment: (a) if a particular color value occurs in relatively few pixels, then such pixels are more likely imperfections in the digital image; and (b) conversely, if a particular color value occurs in relatively many pixels, then such pixels are more likely part of the original image (e.g., original image before imperfections were introduced by scanning) or part of a tinted background (e.g., gray, cyan, or green tint) of the digital image.

Referring again to FIG. 2, at a next step 208, the system 100 analyzes the color distribution to determine whether all pixels (of the digital image) have a pure white (value 255) color. In response to the system 100 determining that all pixels (of the digital image) have a pure white (value 255) color, the operation continues from the step 208 to a step 210, where the system 100 outputs a message (e.g., to the user 102) for stating that the digital image is blank. Conversely, in response to the system 100 determining that one or more pixels (of the digital image) have other than a pure white (value 255) color, the operation continues from the step 208 to a step 212.

At the step 212, the system 100 calculates a "minimum ink density" value (which is a particular color value) for the digital image. To calculate the minimum ink density value, the system 100 analyzes the color distribution (in reverse from 255 to 0) to identify a first discrete group of color values that are concentrated (in frequency of occurrence) adjacent to one another within the color distribution. The first discrete group is a continuous range of color values that: (a) starts with a particular color value that occurs in relatively few pixels ("first starting color"), and which accordingly has a relatively low pixel count; (b) ends with a particular color value that occurs in relatively few pixels ("first ending color"), and which accordingly has a relatively low pixel count; and (c) in between the first starting color and the first ending color, has several color values that occur in relatively many pixels, and which accordingly have relatively high pixel counts. Accordingly, the first discrete group is the lightest (closest to white) discrete group of color values that occur in pixels of the digital image.

In the illustrative embodiment, the system 100 operates as if the first discrete group is part of a tinted background of the digital image. In the example of FIG. 3, the first discrete group has color values 229 (first starting color) through 192 (first ending color). In one example, the system 100 identifies the first discrete group by iteratively applying a Gaussian curve-fitting technique to candidate discrete groups of color values within the graph of color distribution, so that the system 100 identifies the two color values having the lowest pixel counts (within the best-fitting Gaussian curve, if calculated from such curve's equation) as being the first starting color (which is the lightest color value within the best-fitting Gaussian curve) and the first ending color (which is the darkest color value within the best-fitting Gaussian curve). In one example, the system 100 selects the candidate discrete groups according to genetic processing techniques.

After identifying the first discrete group, the system 100 further analyzes the color distribution (continuing in reverse from the first ending color to 0) to identify a second discrete group of color values that are concentrated (in frequency of occurrence) adjacent to one another within the color distribution. The second discrete group is a continuous range of color values that: (a) starts with a particular color value that occurs in relatively few pixels ("second starting color"), and which accordingly has a relatively low pixel count; (b) ends with a particular color value that occurs in relatively few pixels ("second ending color"), and which accordingly has a relatively low pixel count; and (c) in between the second starting color and the second ending color, has several color values that occur in relatively many pixels, and which accordingly have relatively high pixel counts. Accordingly, the second discrete group is the next-to-lightest discrete group of color values that occur in pixels of the digital image.

In the illustrative embodiment, the system 100 operates as if the second discrete group is the lightest (closest to white) part of the original image (e.g., original image before imperfections were introduced by scanning), other than the background. In the example of FIG. 3, the second discrete group has color values 191 (second starting color) through 159 (second ending color). In one example, the system 100 identifies the second discrete group by iteratively applying a Gaussian curve-fitting technique to candidate discrete groups of color values within the graph of color distribution, so that the system 100 identifies the two color values having the lowest pixel counts (within the best-fitting Gaussian curve, if calculated from such curve's equation) as being the second starting color (which is the lightest color value within the best-fitting Gaussian curve) and the second ending color (which is the darkest color value within the best-fitting Gaussian curve).

After identifying the second discrete group, the system 100 finishes calculating the minimum ink density value at the step 212 by: (a) further analyzing the color distribution to identify the adjacent pair of color values (within the second discrete group) whose slope (calculated between the 2 respective pixel counts of such pair) is closest to zero; and (b) determining the minimum ink density value as being equal to the lightest color value (highest value) of such identified pair. In the example of FIG. 3: (a) the adjacent pair of color values 176 and 175 has a slope (calculated between the 2 respective pixel counts of such pair) that is closest to zero, among such calculated slopes of each adjacent pair of color values within the second discrete group; and (b) accordingly, the system 100 determines the minimum ink density value as being equal to the color value 176 (value=176), which is the lightest color (highest value) of such pair. In that manner, the system 100 determines the minimum ink density value as being a color value whose frequency of occurrence is relatively high within a section (of the second discrete group) whose frequency of occurrence is relatively high within the color distribution.

If a first adjacent pair of color values has a first slope (calculated between the 2 respective pixel counts of such pair) that is closest to zero, among such calculated slopes of each adjacent pair of color values within the second discrete group, yet such calculated slope of a second adjacent pair of color values (within the second discrete group) has an absolute value that equals the first slope's absolute value, then the system 100: (a) identifies the lightest colored (highest valued) of those first and second pairs; and (b) determines the minimum ink density value as being equal to the lightest color (highest value) of such identified pair. In an alternative embodiment, the system 100 identifies the minimum ink density value as being the median/mean color value within the second discrete group's best-fitting Gaussian curve (discussed hereinabove). Such median/mean color value has the highest pixel count if calculated from such curve's equation.

After the step 212, the operation continues to a step 214, where the system 100 further analyzes the color distribution to identify the darkest color value ("darkest valid color"): (a) whose pixel count is non-zero; and (b) whose 8-bit color value is within $K \cdot \sigma$ of $\mu$, where K is a predetermined positive number, $\sigma$ is the standard deviation of the 8-bit color values that have non-zero pixel counts, and $\mu$ is the mean of the 8-bit color values that have non-zero pixel counts. In one example, K=1.

In that manner, the system 100 identifies the darkest color value whose pixel count is non-zero, but whose 8-bit color value is not anomalous within the set of color values (of the digital image) whose pixel counts are non-zero. Accordingly, at the step 214, the system 100 also: (a) identifies anomalously dark pixels (whose 8-bit color values are beyond $K \cdot \sigma$ of $\mu$), if any; and (b) modifies such pixels' respective 8-bit color values to equal the darkest valid color that was identified at the step 214. In the example of FIG. 3, the system 100 identifies the darkest valid color as being the 8-bit color value=66 (whose pixel count=2).

After the step 214, the operation continues to a step 216, where the system 100 calculates an "ink offset" value as being equal to an 8-bit "offset" color value minus the 8-bit color value of the darkest valid color that was identified at the step 214. In that manner, the system 100 determines an amount (ink offset value) for darkening/lightening pixels of the digital image. In the illustrative embodiment, the 8-bit offset color value is specified by the user 102. In the example of FIG. 3: (a) the 8-bit offset color value is pure black (value 0); (b) the darkest valid color is 66; (c) the ink offset value is −66, which is a negative integer; and (d) accordingly, the darkest pixels of the digital image become pure black as a result of such darkening/lightening.

After the step 216, the system 100 processes the digital image on a pixel-by-pixel basis, in response to the minimum ink density value (calculated at the step 212) and the ink offset value (calculated at the step 216). Accordingly, after the step 216, the operation continues to a step 218, where the system 100 initializes a current row as being equal to a first row of pixels of the digital image. At a next step 220, the system 100 initializes a current column as being equal to a first column of pixels of the digital image. At a next step 222, the system 100 reads the digital image to determine the 8-bit color value of the pixel at the current row and current column. At a next step 224, the system 100 determines whether the pixel's 8-bit color value is darker than (or equal to) the minimum ink density value.

In response to the system 100 determining (at the step 224) that the pixel's 8-bit color value is lighter than the minimum ink density value, the operation continues from the step 224 to a step 226, where the system 100 modifies the pixel's 8-bit color value to equal an 8-bit background color value. In the illustrative embodiment, the 8-bit background color value is specified by the user 102. In that manner, the system 100 operates as if the pixel is part of a tinted background of the digital image. Accordingly, by modifying the pixel's 8-bit color value to equal the 8-bit background color value, the system 100 replaces such tinted background with a different color background. For example, if the 8-bit background color value is pure white (value 255), then the system 100 replaces such tinted background with a pure white background.

Conversely, in response to the system 100 determining (at the step 224) that the pixel's 8-bit color value is darker than (or equal to) the minimum ink density value, the operation continues from the step 224 to a step 228, where the system 100 modifies the pixel's 8-bit color value by adding the ink offset value (calculated at the step 216). In that manner, the system 100 darkens/lightens the pixel. In the example of FIG. 3, the ink offset value is −66, so the system 100 modifies (at the step 228) the pixel's 8-bit color value ("CV") by adding −66, such that $CV_{modified} = CV_{original} + (-66) = CV_{original} - 66$.

After the step 226, the operation continues to a step 230. Likewise, after the step 228, the operation continues to the step 230. At the step 230, the system 100 determines whether a next column exists in the current row. In response to the system 100 determining (at the step 230) that a next column exists in the current row, the operation continues to a step 232, at which the system 100 modifies the current column as being equal to the next column. After the step 232, the operation returns to the step 222.

By comparison, in response to the system 100 determining (at the step 230) that a next column does not exist in the current row, the operation continues to a step 234, at which the system 100 determines whether a next row of pixels exists in the digital image. In response to the system 100 determining (at the step 234) that a next row of pixels exists in the digital image, the operation continues to a step 236, at which the system 100 modifies the current row as being equal to the next row. After the step 236, the operation returns to the step 220. Conversely, in response to the system 100 determining (at the step 234) that a next row of pixels does not exist in the digital image, the operation ends, so that such processing of the digital image is complete.

By automatically processing numerous digital images according to the operation of FIG. 2, the system 100 automatically: (a) substantially removes various tint in backgrounds of the digital images; (b) darkens/lightens the digital images to enhance a contrast between such images and their backgrounds; and (c) substantially removes various imperfections (e.g., wrinkles, smudges, fingerprints, visible reverse images) in the digital images. In that manner, the digital images are more suitable for the system 100 to automatically process for appearing more consistently centered and more consistently angled (from image to image, relative to one another) when displayed sequentially on the display device 108. Such automatic processing of numerous digital images is advantageous in comparison to manual processing.

Figure 4:
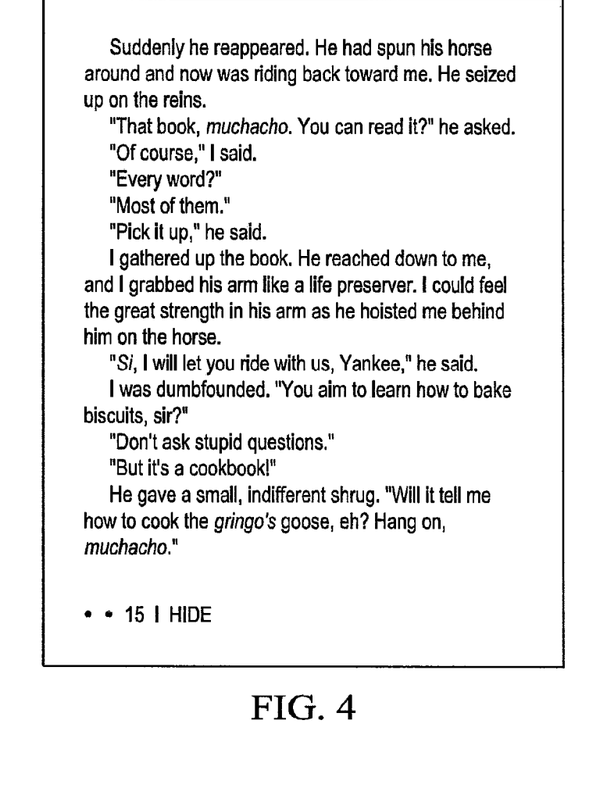
FIG. 4 is an example digital image before processing by the system of FIG. 1 according to the operation of FIG. 2.

FIG. 4 is an example digital image before processing by the system 100 according to the operation of FIG. 2. As shown in FIG. 4, the example digital image: (a) has tint in its background, limited contrast between such image and its background, and various imperfections; and (b) is off-center and improperly angled.

Figure 5:
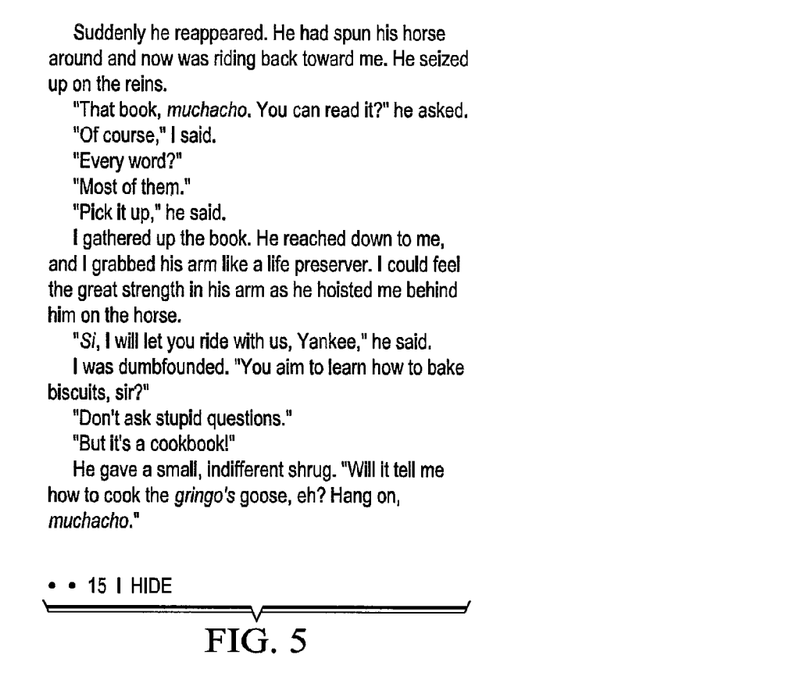
FIG. 5 is the example digital image after processing by the system of FIG. 1 according to the operation of FIG. 2.

FIG. 5 is the example digital image after processing by the system 100 according to the operation of FIG. 2. As shown in FIG. 5, the example digital image (in comparison to FIG. 4): (a) has less tint in its background, enhanced contrast between such image and its background, and fewer imperfections; and (b) is more centered and more properly angled.

Figure 6:
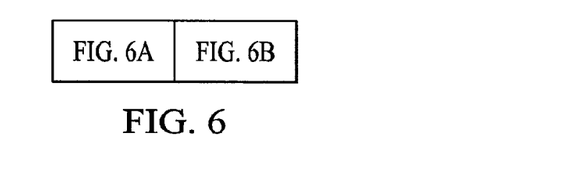
FIG. 6 is an illustration of a first screen displayed by a display device of the system of FIG. 1, including an example digital image before processing by the system of FIG. 1 according to the operation of FIG. 2.
Figure 6A:
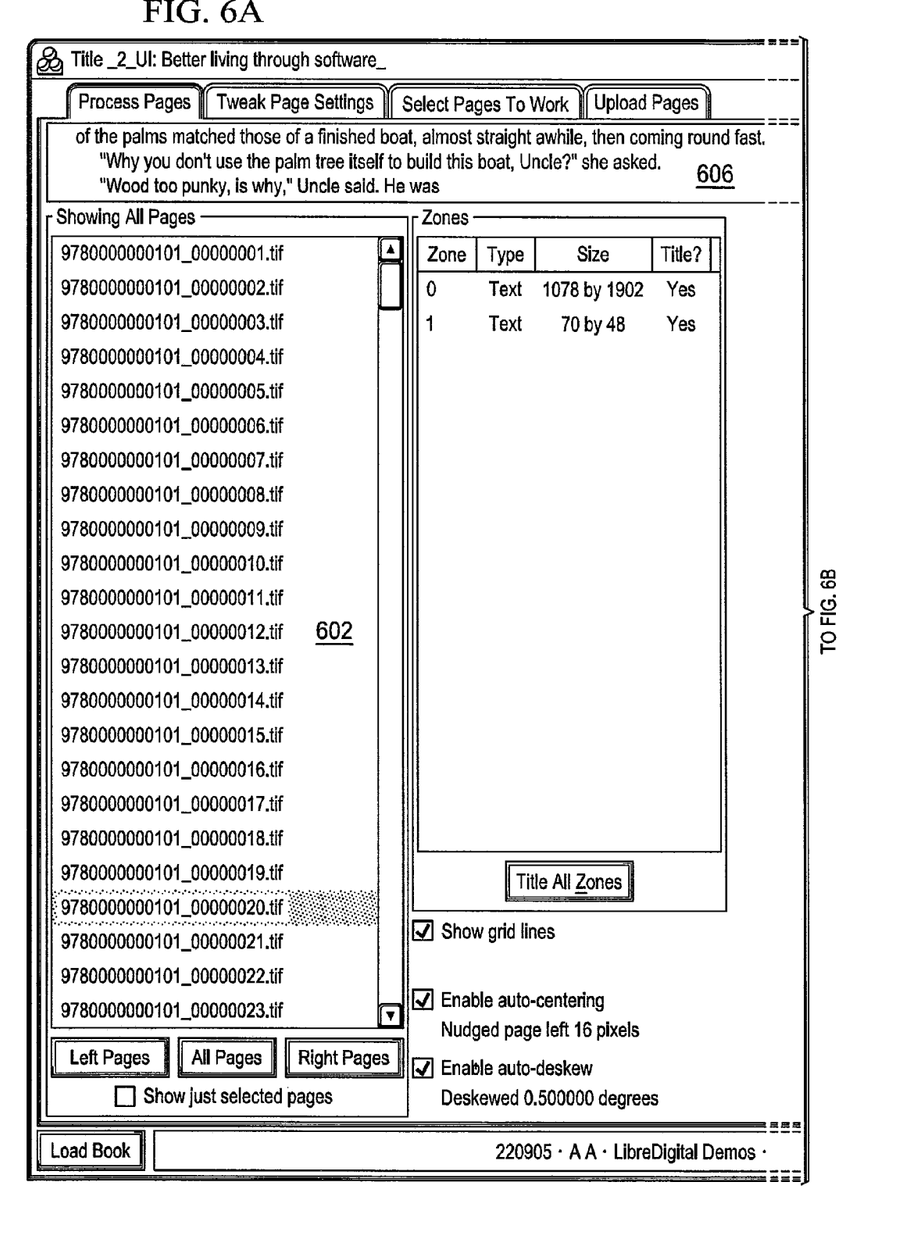
Figure 6B:
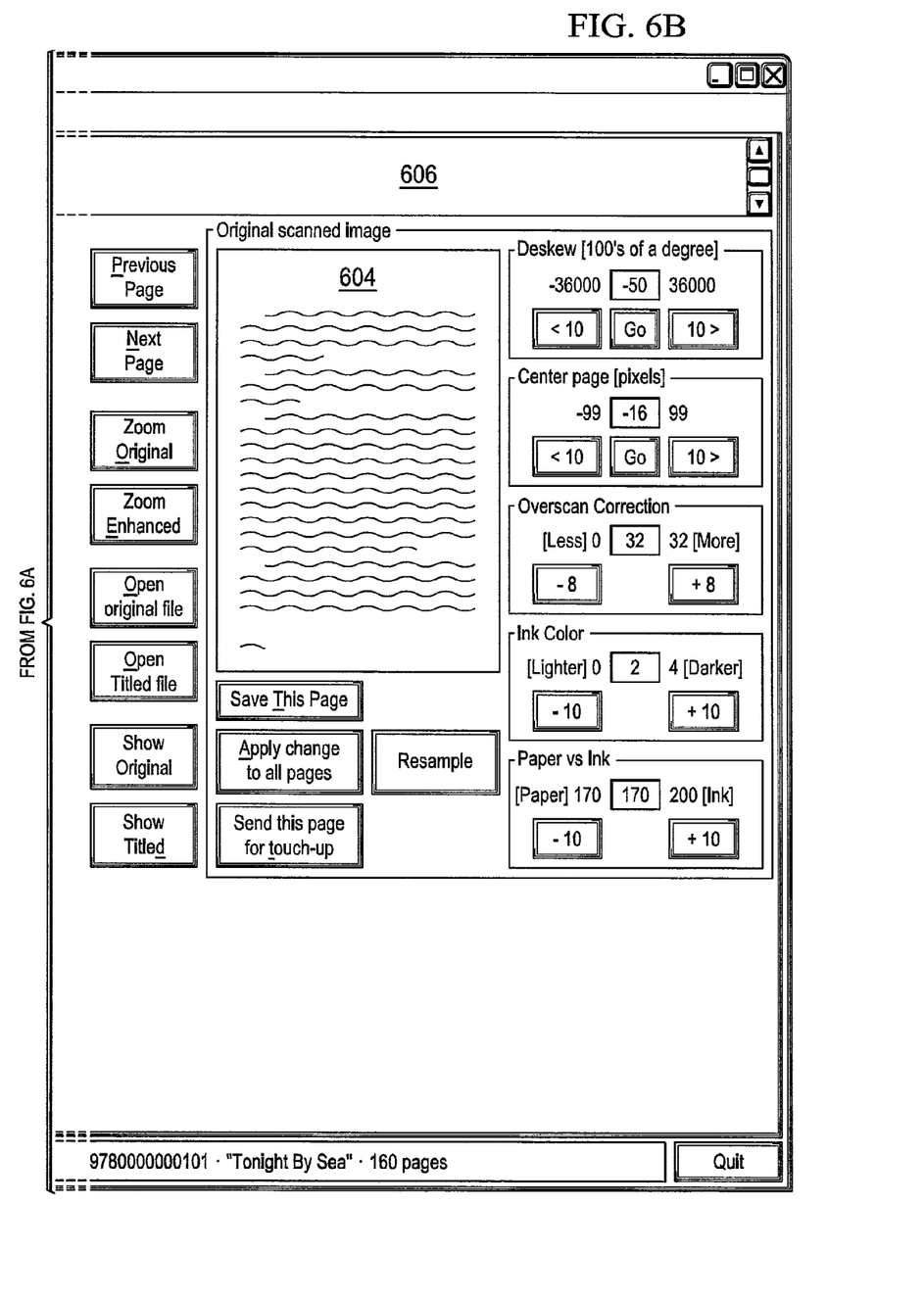

FIG. 6 is an illustration of a first screen displayed by the display device 108, including an example digital image before processing by the system 100 according to the operation of FIG. 2. The system 100 executes instructions of a software program to perform operations that are discussed further hereinbelow in connection with FIG. 6 and FIG. 7. The display device 108 displays the screen of FIG. 6, in response to signals from the computer 104.

Referring to FIG. 6, in response to the user 102 clicking (e.g., by suitably operating the input device 106) a "Load Book" button, the computer 104 commands the display device 108 to display (in the region 602) a list of digital images that were scanned from a particular document selected by the user 102. In the example of FIG. 6, the particular document is "220905—AA—LibreDigital Demos—9780000000101—'Tonight By Sea,'" which has 160 pages.

In response to the user 102 clicking a "Left Pages" button, the computer 104 commands the display device 108 to display (in the region 602) a list of digital images that were scanned from only left-facing pages of the particular document. In response to the user 102 clicking a "Right Pages" button, the computer 104 commands the display device 108 to display (in the region 602) a list of digital images that were scanned from only right-facing pages of the particular document. In response to the user 102 clicking an "All Pages" button, the computer 104 commands the display device 108 to display (in the region 602) a list of all digital images that were scanned from pages of the particular document.

The user 102 views the list of digital images that are displayed in a region 602. By suitably operating the input devices 106, the user 102 selects one of the digital images (e.g., the file "9780000000101__00000020.tif," as highlighted in FIG. 6) to be displayed in a region 604. In response to the user 102 clicking a "Previous Page" button, the computer 104 commands the display device 108 to display (in the region 604) a digital image that was scanned from the previous page of the particular document. In response to the user 102 clicking a "Next Page" button, the computer 104 commands the display device 108 to display (in the region 604) a digital image that was scanned from the next page of the particular document.

In response to the user 102 clicking one or more suitable buttons within the "Deskew (100's of a degree)" region, the system 100 rotates the digital image (displayed in the region 604) by a number of degrees as specified (in the "Deskew" region) by the user 102. In response to the user 102 clicking one or more suitable buttons within the "Center page (pixels)" region, the system 100 shifts such digital image by a number of pixel-widths as specified (in such region) by the user 102. Accordingly, in the example of FIG. 6, the computer 104 commands the display device 108 to display messages, stating that the system 100: (a) rotated such digital image by 0.5 degrees, as specified by the user 102; and (b) shifted such digital image to the left by 16 pixel-widths, as specified by the user 102.

In response to the user 102 clicking one or more suitable buttons within the "Overscan Correction" region, the system 100 modifies certain pixels' 8-bit color values to equal the 8-bit background color value, where such pixels exist along edges of the digital image (displayed in the region 604). For example, the user 102 may know that a certain margin size of background (e.g., white) space should exist along edges of such digital image. Moreover, a risk exists that edges of such digital image were improperly scanned by the scanner, especially if the particular document failed to occupy an entire area that was scanned (e.g., if the particular document was smaller than, rotated within, or shifted within the area that was scanned).

In the "Overscan Correction" region, the extent of such modification (e.g., margin size of background space to exist along edges of such digital image) is specified by the user 102. Accordingly, if the "Overscan Correction" value is specified by the user 102 as: (a) 32, then the extent of such modification is larger; or (b) 0, then the extent of such modification is smaller.

In response to the user 102 clicking one or more suitable buttons within the "Ink Color" region, the system 100 establishes the 8-bit offset color value, as specified (in such region) by the user 102. Accordingly, if the "Ink Color" value is specified by the user 102 as: (a) 4, then the 8-bit offset color value is pure black (value 0); or (b) 0, then the 8-bit offset color value is pure white (value 255).

In response to the user 102 clicking one or more suitable buttons within the "Paper vs Ink" region, the system 100 establishes the 8-bit background color value, as specified (in such region) by the user 102. Accordingly, if the "Paper vs Ink" value is specified by the user 102 as: (a) 200, then the 8-bit background color value is pure black (value 0); or (b) 170, then the 8-bit background color value is pure white (value 255).

In response to the user 102 clicking a "Resample" button, the system 100 processes the digital image (displayed in the region 604) according to the "Deskew" region's specified number of degrees, the "Center page (pixels)" region's specified number of pixel-widths, the "Overscan Correction" value, the "Ink Color" value, and the "Paper vs Ink" value.

In response to the user 102 clicking a "Tide All Zones" button, the system 100 processes the digital image (displayed in the region 604) according to the operation of FIG. 2. After such processing: (a) in response to the user 102 clicking an "Enable auto-centering" box, the system 100 automatically processes such digital image to improve its centering; (b) in response to the user 102 clicking an "Enable auto-deskew" box, the system 100 automatically processes such digital image to improve its angling (orientation); and (c) in response to the user 102 clicking a "Show Tided" button, the computer 104 commands the display device 108 to display (in the region 604) such digital image after such processing.

Figure 7:
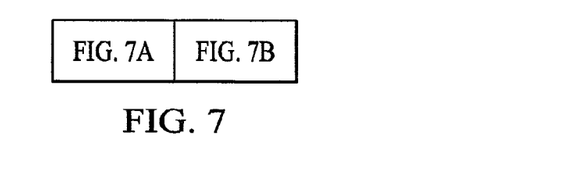
FIG. 7 is an illustration of a second screen displayed by the display device of the system of FIG. 1, including the example digital image after processing by the system of FIG. 1 according to the operation of FIG. 2.
Figure 7A:
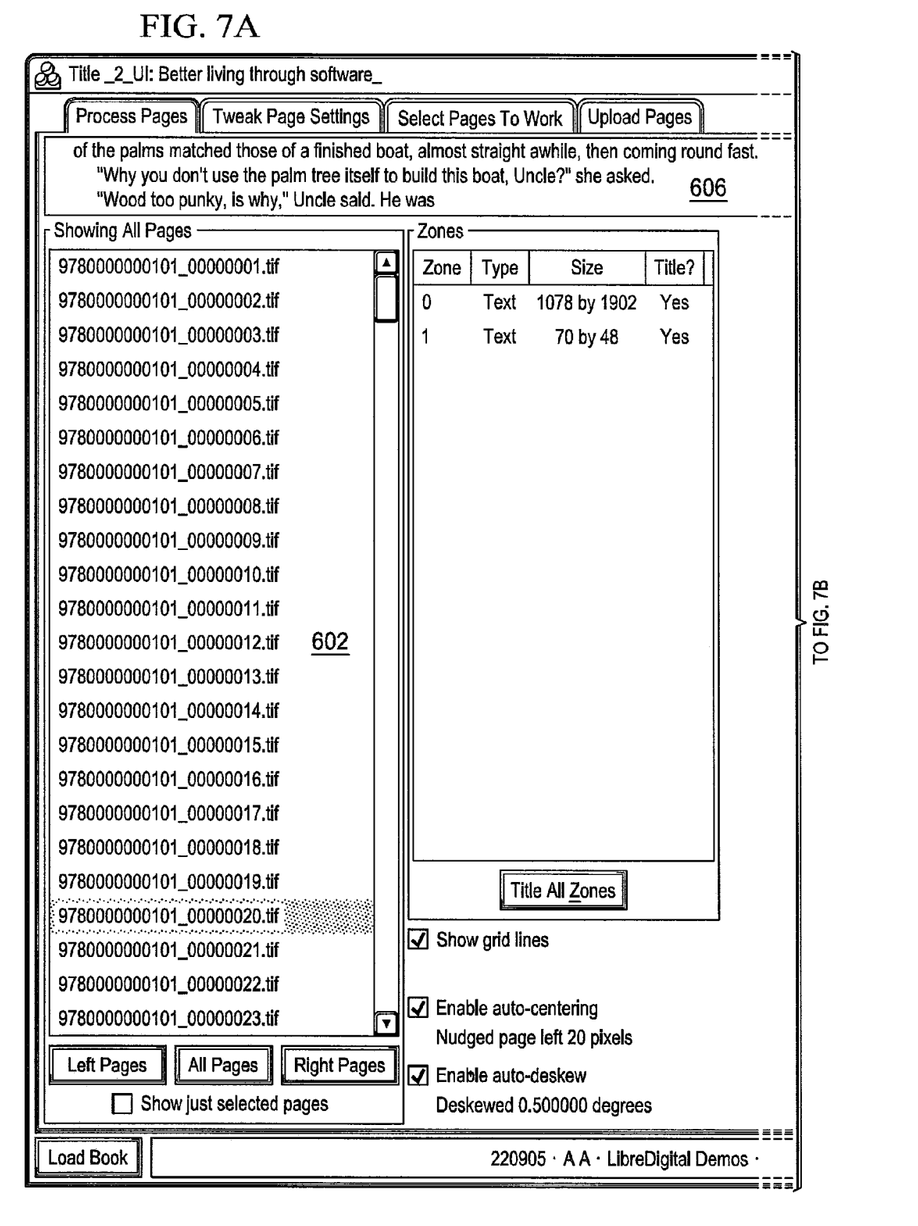
Figure 7B:
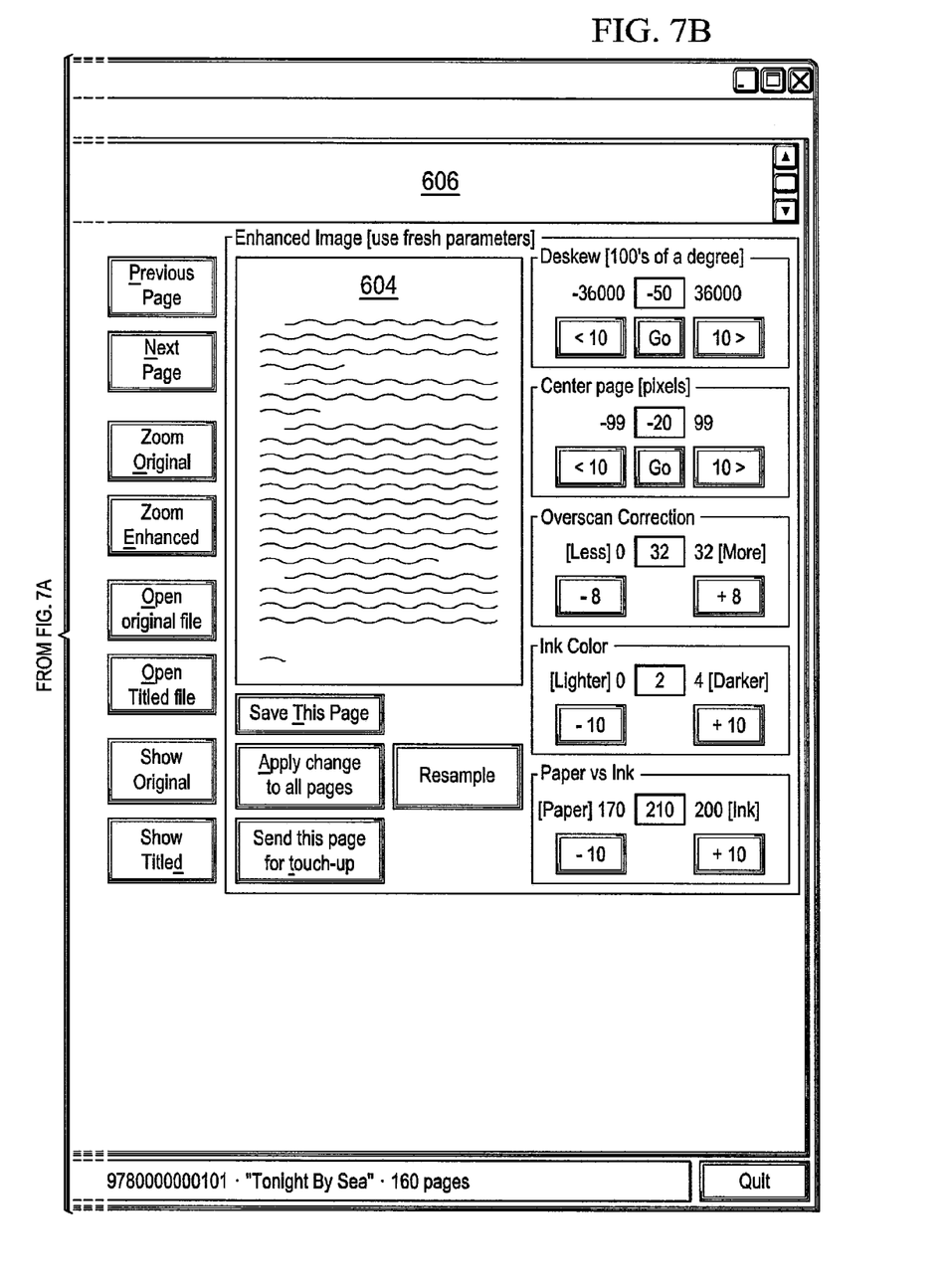

FIG. 7 is an illustration of a second screen displayed by the display device 108, including such digital image (in the region 604) after such processing. In response to the user 102 clicking a "Show Original" button, the computer 104 commands the display device 108 to display (in the region 604) such digital image before such processing. In response to the user 102 clicking a "Zoom Original" button, the computer 104 commands the display device 108 to display (in the region 606) a magnified view of such digital image before such processing. Or, in response to the user 102 clicking a "Zoom Enhanced" button, the computer 104 commands the display device 108 to display (in the region 606) a magnified view of such digital image after such processing. In that manner, the user 102 may alternate between viewing: (a) such digital image before such processing; and (b) such digital image after such processing. Such alternate viewing is helpful to confirm effectiveness of such processing on such digital image.

In response to the user 102 clicking a "Save This Page" button, the system 100 stores the processed digital image on the computer-readable medium 112. In response to the user 102 clicking an "Open original file" button, the computer 104 commands the display device 108 to read (from the computer-readable medium 112) and display (in the region 604) such digital image before such processing. Or, in response to the user 102 clicking an "Open Tided file" button, the computer 104 commands the display device 108 to read (from the computer-readable medium 112) and display (in the region 604) such digital image after such processing.

In response to the user 102 clicking an "Apply change to all pages" button, the system 100 automatically performs such processing, with the same parameters (including the "Deskew" region's specified number of degrees, the "Center page (pixels)" region's specified number of pixel-widths, the "Overscan Correction" value, the "Ink Color" value, and the "Paper vs Ink" value, if any), on all other digital images that were scanned from the particular document. Such automatic processing of numerous images is advantageous (e.g., faster) in comparison to manual processing. Nevertheless, if the user 102 is viewing a particular digital image (in the region 604) that would especially benefit from manual processing: (a) the user 102 may click a "Send this page for touch-up" button; and (b) in response thereto, the computer 102 electronically sends (e.g., via the network) the particular digital image to be manually processed by a human.

Referring again to FIG. 1, the computer 104 and the computer-readable medium 114 are structurally and functionally interrelated with one another, as described further hereinbelow. In that regard, the computer-readable medium 114 is a representative one of the computer-readable media of the system 100 (including, but not limited to, the computer-readable medium 112). The computer-readable medium 114 stores (or encodes, or records, or embodies) functional descriptive material (including, but not limited to, software and data structures). Such functional descriptive material imparts functionality when encoded on the computer-readable medium 114. Also, such functional descriptive material is structurally and functionally interrelated to the computer-readable medium 114.

Within such functional descriptive material, data structures define structural and functional interrelationships between such data structures and the computer-readable medium 114 (and other aspects of the computer 104 and the system 100). Such interrelationships permit the data structures' functionality to be realized. Also, within such functional descriptive material, software (also referred to as computer programs or applications) defines structural and functional interrelationships between such software and the computer-readable medium 114 (and other aspects of the computer 104 and the system 100). Such interrelationships permit the software's functionality to be realized.

For example, the computer 104 reads (or accesses, or copies) such functional descriptive material from the computer-readable medium 114 into the memory device of the computer 104, and the computer 104 performs its operations (as described elsewhere herein) in response to such material, which is stored in the memory device of the computer 104. More particularly, the computer 104 performs the operation of processing software (which is stored, encoded, recorded or embodied on a computer-readable medium) for causing the computer 104 to perform additional operations (as described elsewhere herein). Accordingly, such functional descriptive material exhibits a functional interrelationship with the way in which the computer 104 executes its processes and performs its operations.

Further, the computer-readable media of the system 100 are apparatus from which the software is accessible by the computer 104, and the software is processable by the computer 104 for causing the computer 104 to perform such additional operations. In addition to reading such functional descriptive material from the computer-readable medium 114, the computer 104 is capable of reading such functional descriptive material from (or through) a network, which is also a computer-readable medium (or apparatus) of the system 100. Moreover, the memory device of the computer 104 is itself a computer-readable medium (or apparatus) of the system 100.

Although illustrative embodiments have been shown and described, a wide range of modification, change and substitution is contemplated in the foregoing disclosure. In some instances, various features of the embodiments may be used without a corresponding use of other features.

What is claimed is:

1. A method for processing a digital image, comprising:
   storing a digital image that includes a set of pixels;
   determining a distribution of color values of the set of pixels of the digital image;
   determining a minimum ink density value associated with the digital image, wherein the minimum ink density value is determined by:
      analyzing the distribution to identify a first range of color values that are the lightest group of color values in the digital image,
      analyzing the distribution to identify a second range of color values that are the next-to-lightest group of color values in the digital image, and
      arriving at the minimum ink density value by analyzing the second range of color values, wherein the analysis of the second range of colors is based on a pixel count associated with an adjacent pair of color values within the second range of colors, and the adjacent pair of color values has a slope that is closest to zero within the second range of color values;
   determining a darkest color value, wherein the darkest color value is determined by analyzing the distribution to identify the darkest color value with a non-zero pixel count;
   determining an ink offset based on the darkest color value; and
   for each pixel of the set of pixels of the digital image:
      determining if a color value associated with the pixel is darker than the minimum ink density value and,
      if the color value of the pixel is darker than the minimum ink density, adjusting the color value associated with the pixel by adding the ink offset to the color value, and
      if the color value of the pixel is not darker than the minimum ink density, setting the color value of the pixel to a background color value.

2. The method of claim 1, wherein the first range of colors values are concentrated adjacent to one another within the distribution according to frequency of occurrence.

3. The method of claim 1, wherein the first range of color values are a continuous range of color values.

4. The method of claim 2, wherein the first range of color values are identified by applying Gaussian curve-fitting to a set of candidate color values to identify two color values having the lowest pixel count within a best fitting Gaussian curve.

5. The method of claim 3, wherein the second range of color values are concentrated adjacent to one another within the distribution according to frequency of occurrence and the second range of color values is a continuous range of color values.

6. The method of claim 1, wherein the background color value is white.

7. A system for digital image processing, comprising:
   a processor; and
   a computer readable medium storing:
      a digital image that includes a set of pixels, and
      a set of instructions executable by the processor for:
         determining a distribution of color values of the set of pixels of the digital image;
         determining a minimum ink density value associated with the digital image, wherein the minimum ink density value is determined by:
            analyzing the distribution to identify a first range of color values that are the lightest group of color values in the digital image,
            analyzing the distribution to identify a second range of color values that are the next-to-lightest group of color values in the digital image, and
            arriving at the minimum ink density value by analyzing the second range of color values, wherein the analysis of the second range of colors is based on a pixel count associated with an adjacent pair of color values within the second range of colors, and the adjacent pair of color values has a slope that is closest to zero within the second range of color values;
         determining a darkest color value, wherein the darkest color value is determined by analyzing the distribution to identify the darkest color value with a non-zero pixel count;
         determining an ink offset based on the darkest color value, and
         for each pixel of the set of pixels of the digital image:
            determining if a color value associated with the pixel is darker than the minimum ink density value and,
            if the color value of the pixel is darker than the minimum ink density, adjusting the color value associated with the pixel by adding the ink offset to the color value, and
            if the color value of the pixel is not darker than the minimum ink density, setting the color value of the pixel to a background color value.

8. The system of claim 7, wherein the first range of colors values are concentrated adjacent to one another within the distribution according to frequency of occurrence.

9. The system of claim 7, wherein the first range of color values are a continuous range of color values.

10. The system of claim 8, wherein the first range of color values are identified by applying Gaussian curve-fitting to a set of candidate color values to identify two color values having the lowest pixel count within a best fitting Gaussian curve.

11. The system of claim 9, wherein the second range of color values are concentrated adjacent to one another within the distribution according to frequency of occurrence and the second range of color values is a continuous range of color values.

12. The system of claim 7, wherein the background color value is white.

13. A non-transitory computer readable medium, comprising instructions executable by a processor to:
   store a digital image that includes a set of pixels;
   determine a distribution of color values of the set of pixels of the digital image;
   determine a minimum ink density value associated with the digital image, wherein the minimum ink density value is determined by:
      analyzing the distribution to identify a first range of color values that are the lightest group of color values in the digital image,
      analyzing the distribution to identify a second range of color values that are the next-to-lightest group of color values in the digital image, and
      arriving at the minimum ink density value by analyzing the second range of color values, wherein the analysis of the second range of colors is based on a pixel count associated with an adjacent pair of color values within the second range of colors, and the adjacent pair of color values has a slope that is closest to zero within the second range of color values;
   determine a darkest color value, wherein the darkest color value is determined by analyzing the distribution to identify the darkest color value with a non-zero pixel count;
   determine an ink offset based on the darkest color value; and
   for each pixel of the set of pixels of the digital image:
      determine if a color value associated with the pixel is darker than the minimum ink density value and,
      if the color value of the pixel is darker than the minimum ink density, adjusting the color value associated with the pixel by adding the ink offset to the color value, and
      if the color value of the pixel is not darker than the minimum ink density, setting the color value of the pixel to a background color value.

14. The computer readable medium of claim 13, wherein the first range of color values are concentrated adjacent to one another within the distribution according to frequency of occurrence.

15. The computer readable medium of claim 13, wherein the first range of color values are a continuous range of color values.

16. The computer readable medium of claim 14, wherein the first range of color values are identified by applying Gaussian curve-fitting to a set of candidate color values to identify two color values having the lowest pixel count within a best fitting Gaussian curve.

17. The computer readable medium of claim 15, wherein the second range of color values are concentrated adjacent to one another within the distribution according to frequency of occurrence and the second range of color values is a continuous range of color values.

18. The computer readable medium of claim 13, wherein the background color value is white.

* * * * *